United States Patent Office 3,708,556
Patented Jan. 2, 1973

3,708,556
PROCESS FOR THE PREPARATION OF POLYPENTENAMERS
Karl Nutzel, Opladen, Karl Dinges, Odenthal, and Friedrich Haas, Cologne, Germany, assignors to Bayer Aktiengesellschaft, Leverkusen, Germany
No Drawing. Filed Apr. 6, 1970, Ser. No. 26,155
Claims priority, application Germany, Apr. 15, 1969, P 19 19 046.6
Int. Cl. C08f 3/02, 1/28
U.S. Cl. 260—931
6 Claims

ABSTRACT OF THE DISCLOSURE

Polymerisation and copolymerisation of cyclopentene with a catalyst of
(a) tungsten hexachloride
(b) an alkyl or aryl tin hydride
(c) a cocatalyst The polymerisation of cyclopentene with tungsten and molybdenum compounds in combination with organometallic compounds and hydride compounds of metals of the Main Groups I to III of the Periodic Table is known but the yields and reaction velocities obtained have so far been insufficient. Although oxygen-containing and sulphur-containing cocatalyst compounds provide better yields, no industrial process can be based on these systems because it is inadvisable to use solvents in such a process in order to prevent long induction periods and low yields. The use of solvents is necessary in industrial polymerisation processes of the Ziegler-Natta type in order to prevent gel formation. Gel formations lead to the formation of deposits on cooled surfaces which necessitates time-consuming cleaning operations. The use of solvents is further necessary in order to control the temperature and to maintain adequate flow by keeping up low viscosities.

Object of this invention is a process for producing polymers and copolymers of cyclopentene wherein cyclopentene and optionally other monomers are polymerized in the presence of a catalyst made from
(a) tungsten hexachloride
(b) an alkyl or aryltin hydride
(c) a cocatalyst.

The process is preferably carried out in a solvent. In principle, bulk polymerisation is also possible but does not provide any particular advantages.

Catalysts

Suitable tin alkyl or aryl hydrides (b) for producing the catalyst of the invention are compounds of the formula

in which R represents an alkyl radical containing 1 to 20 carbon atoms, a cycloalkyl radical containing 3 to 8 carbon atoms or an aryl radical, and $x$ is 1, 2 or 3. The aryl radicals are preferably phenyl, naphthyl or diphenyl.
Aliphatic alkyl tin hydrides of the formula

in which R represents an alkyl group having 1–20 carbon atoms, e.g. ethyl, propyl, i-butyl, hexyl, dodecyl are most preferred.

Alkyl and aryl tin hydrides are known compounds.
Compounds which contain —OH or —O—O— groups may be used as cocatalysts (c). These compounds may also contain halogen. Examples of such compounds are opoxides, aldehydes, alcohols or hydroperoxides such as ethanol, cyclohexanol, chloroethanol, chlorophenols, cyclopentenyl hydroperoxide, ethylene oxide, chloral and benzaldeheyde. Nitro compounds, which may also be halosubstituted, are also suitable. Examples are nitrobenzene, picryl chloride and 1,2-dinitro-3,5-dichlorobenzene.

The amount of tungsten hexachloride (a) used is generally 0.2 to 5 millimol, preferably 0.2 to 0.8 millimol per 100 g. of cyclopentene (and, if desired, other monomers). The molar ratio of tungsten to tin should be between 1:0.1 and 1:5, preferably between 1:0.2 and 1:06. The quantity of cocatalysts depends on the particular substances used. The molar ratio of tungsten to cocatalyst is generally 1:0.2 to 1:1 in the case of OH and O—O compounds, and 1:0.1 to 1:7 in the case of nitro compounds.

The catalyst are normally prepared by introducing the catalyst components into a suitable solvent under exclusion of air and moisture at temperatures between about —30 and +15° C. Solvents to be used are the same solvents which are suitable for the polymerisation step. During catalyst preparation the monomer (or monomers) can be present but need not be present. The sequence of introducing the catalyst constituents is in principle arbitrary, however it is preferred to introduce the tungsten hexachloride first (very often and for convenience as a solution in a solvent as described below) followed by the cocatalyst. These steps are mostly carried out at 10 to 25° C. Subsequently the tin alkyl or aryl hydride is added (also conveniently as a solution in one of the solvents for the polymerisation). Preferably for this step the temperature is between about —30 and 0° C.

Polymerisation

If the process is carried out as a solution polymerisation, e.g. aliphatic, cycloaliphatic or aromatic hydrocarbons may be used as solvents. Aromatic solvents such as toluene are preferred. Petroleum hydrocarbon fractions, cyclohexane and benzene are other examples of suitable solvents. The concentration of cyclopentene (and other monomers, if any) in these solvents should be about 5 to 25%, preferably 15 to 20%.

According to the invention, cyclopentene may be polymerised alone, but other cyclic unsaturated monomers may also be copolymerised in quantities of up to 30% by weight based on cyclopentene. It is preferable to use 0.05 to 5%, based on cyclopentene weight. Suitable comonomers are, in particular other olefines, preferably bicyclic or polycyclic olefines, such as dicyclopentadiene, norbornene and norbornadiene. The polymerisation process is generally carried out by introducing a solution of the cyclopentene in one of the solvents mentioned above into a reaction vessel and adding the catalyst components or a separately prepared catalyst to the solution. It is preferable to work under a protective gas atmosphere in order to exclude moisture and atmospheric oxygen, for example an atmosphere of nitrogen or argon. Atmospheric pressure is generally employed but the process may also be carried out under elevated pressure. Polymerisation generally proceeds at temperatures of between —30 and +30° C., preferably +15 to —15° C. The reaction takes from about 1 to 24 hours.

Before the polymers are isolated at the end of the reaction, it is advantageous to stop polymerisation with about 5%, based on the amount of monomer used, of a proton active compound such as formic acid or methanol.

It is advisable to add a complex forming compound at the same time which prevents catalyst residues from remaining in the polymer after the polymer has been worked up. Diamines and aminoalcohols such as ethylene diamine or aminoethanol are suitable for this purpose.

The polymer can be isolated by precipitation with an excess (e.g. 3 to 5 times the amount of polymer solution)

of a lower alcohol in which an age resister such as ditertiary butyl cresol, β-phenyl naphthylamine or the like has been dissolved before precipitation. Alternatively, the solution may be introduced into boiling water and the solvent removed with steam. In this case, the age resister can be added with the polymerisation inhibitor to the polymer solution.

The polymers thus isolated which are still moist with water or alcohol may be freed from residues of the coagulation medium in a circulating air oven or in a drying screw.

The polymerization and working up process may, of course, be carried out continuously.

The polymers obtained are polypentenamers with a high trans double bond content. The trans content is generally above 90%, in most cases between 90 and 98%. It can be determined from the infrared spectrum of the products. Transpolypentenamers are rubber-like substances.

In the following examples, only dry apparatus and reagents are used and the processes are carried out under a protective gas atmosphere of pure nitrogen.

EXAMPLE 1

1000 g. of anhydrous toluene which is free from air and 200 g. of anhydrous cyclopentene are placed in an anhydrous, air-free autoclave which is equipped with a stirrer which has no packing gland and a thermometer and these materials are covered with purest nitrogen. 1 mmol of $WCl_6$ dissolved in 20 g. of toluene, followed by 0.5 mmol of cyclopentenyl hydroperoxide are introduced at room temperature with the exclusion of air. After cooling to —10° C., 0.3 mmol of tin triethylhydride dissolved in 50 g. of toluene are introduced with a syringe. The temperature is kept between 0 and —5° C. by external cooling. After 2 hours, the reaction is stopped by the addition of 10 g. of ethanolamine, and 1.5 g. of 4-methyl-2,5-ditertiary butyl-phenol are added. The polymer is isolated by introducing the viscous solution into 5 times its quantity of methanol and the polymer obtained is dried in a circulating air cupboard. The yield is 58% of the theoretical, the trans bond content 93.8%.

EXAMPLE 2

As described in Example 1, cyclopentene is polymerised with a combination of 1 mmol of $WCl_6$, 0.5 mmol of ethanol and 0.4 mmol of tin dibutylidihydride. The yield obtained after 4 hours is 61% of the theoretical, the trans bond content 91.2%.

EXAMPLE 3

Cyclopentene is polymerised with 0.8 mmol of $WCl_6$, 0.1 mmol of 1,2-dinitro-3,5-dichlorobenzene and 1.6 mmol of tin triethylhydride and worked up by the method described in Example 1. The yield after 1.5 hours is 78% of the theoretical, the trans bond content is 93.8%.

EXAMPLE 4

Cyclopentene is polymerised with 1.2 mmol of $WCl_6$ which had been reacted with 1.2 mmol of ethanol before polymerisation, and with 1.8 mmol of tin triethylhydride by the method described in Example 1. The yield is 54% of the theory, the trans bond content is 92.8%.

EXAMPLE 5

Using the method described in Example 1, cyclopentene is polymerised with 1.2 mmol of $WCl_6$, 0.1 mmol of 1,2-dinitro-3,5-dichlorobenzene and 2.0 mmol of tin triphenylhydride. The yield is 58% of the theoretical, the trans bond content 92.7%.

We claim:
1. Process for producing cyclopentene homopolymers or copolymers, wherein cyclopentene is polymerised at —30 to +30° C. in the presence of a catalyst made from
   (a) tungsten hexachloride,
   (b) an alkyl, cycloalkyl or aryl tin hydride and
   (c) a cocatalyst selected from compounds which contain OH or O—O groups.
2. Process according to claim 1, wherein up to 30% by weight of a bicyclic or polycyclic olefine, based on cyclopentene, is copolymerised with cyclopentene.
3. Process according to claim 1, wherein polymerisation is carried out in an inert organic solvent.
4. Process according to claim 1, wherein the alkyl or aryl tin hydride (b) is a compound of the formula

$$SnR_xH_{4-x}$$

in which R represents an alkyl radical having 1 to 20 carbon atoms, a cycloalkyl radical having 3 to 8 carbon atoms or an aryl radical, and $x$ is 1, 2 or 3.

5. Catalyst composition for polymerising cyclopentene consisting of
   (a) tungsten hexachloride,
   (b) an alkyl or aryl tin hydride and
   (c) a cocatalyst selected from compounds which contain OH or O—O groups.
6. Catalyst composition according to claim 5 consisting of
   (a) 1 mol of tungsten hexachloride,
   (b) 0.1 to 5 mols of a tin compound of the formula $$SnR_xH_{4-x}$$

wherein R represents an alkyl radical having 1 to 20 carbon atoms, a cycloalkyl radical having 3 to 8 carbon atoms or an aryl radical and $x$ is 1, 2 or 3,
   (c) 0.1 to 7 mols of cocatalyst selected from compounds which contain OH or O—O groups.

References Cited

UNITED STATES PATENTS

| | | | |
|---|---|---|---|
| 3,624,060 | 11/1971 | Judy | 260—88.2 R |
| 3,026,269 | 3/1962 | Gresham et al. | 252—429 |
| 3,088,940 | 5/1963 | Jenkins | 260—88.7 |
| 3,163,629 | 12/1963 | Li | 260—93.7 |
| 3,449,310 | 6/1969 | Dall'Asta | 260—93.1 |
| 3,458,489 | 7/1969 | Natta et al. | 260—93.1 |
| 3,459,725 | 8/1969 | Natta et al. | 260—93.1 |
| 3,476,728 | 11/1969 | Natta et al. | 260—93.1 |
| 3,476,730 | 11/1969 | Streck et al. | 260—93.1 |

HARRY WONG, Jr., Primary Examiner

S. M. LEVIN, Assistant Examiner

U.S. Cl. X.R.

252—429 B; 260—88.2 B